June 9, 1959  R. A. NOURSE  2,889,903
SAFETY DEVICE FOR HYDRAULIC SYSTEMS
Filed March 22, 1956
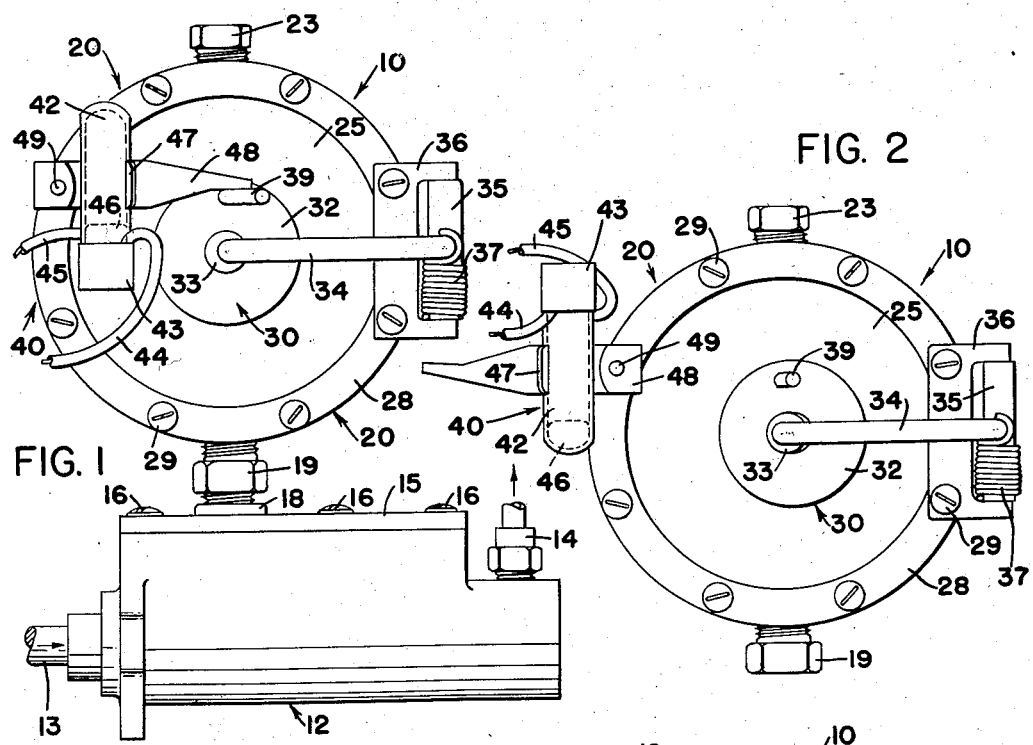
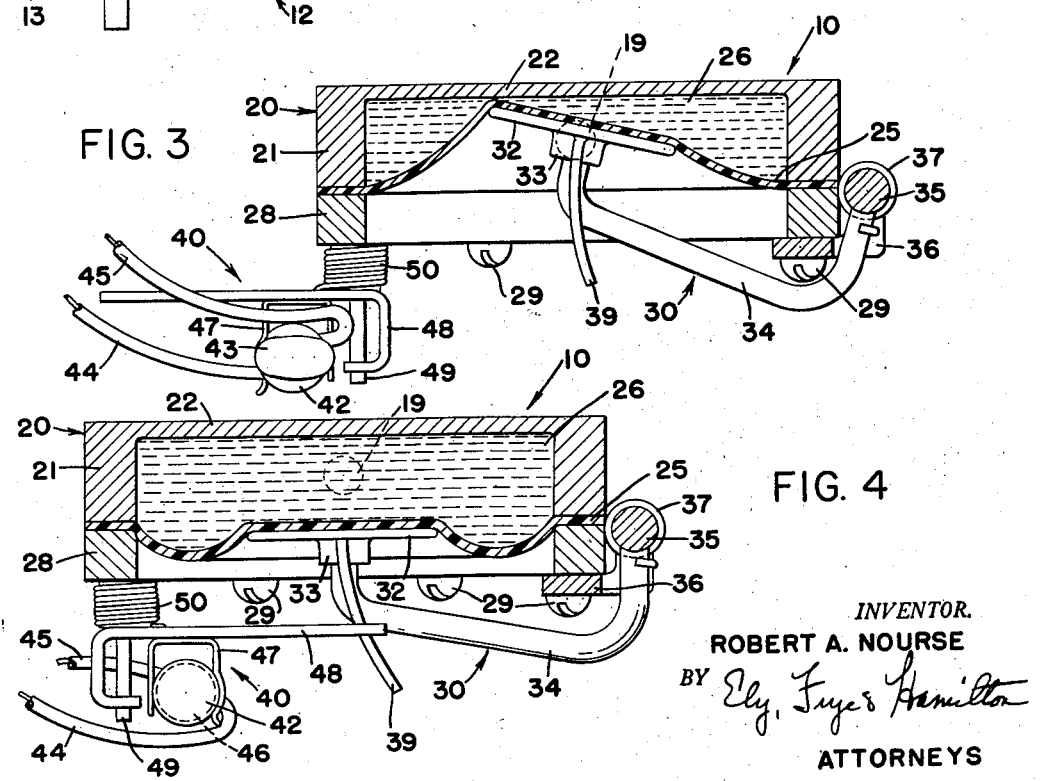
INVENTOR.
ROBERT A. NOURSE
BY Ely, Frye & Hamilton
ATTORNEYS 2,889,903

SAFETY DEVICE FOR HYDRAULIC SYSTEMS

Robert A. Nourse, Akron, Ohio

Application March 22, 1956, Serial No. 573,152

6 Claims. (Cl. 192—1)

The present invention relates to a safety device for hydraulic systems. More particularly, the invention relates to an improved device for monitoring a vehicular hydraulic brake system and for preventing operation of the vehicle when the amount of hydraulic fluid in the system is low and unsafe.

An object of the invention is to provide a device forming a permanent part of a vehicular hydraulic brake system, and which will monitor the amount of hydraulic fluid in such system.

Another object is to provide a device adapted for connection to the master cylinder of a vehicular hydraulic brake system, which will continually measure and indicate the amount of hydraulic fluid in the cylinder and in the system, and which will open the ignition circuit of the vehicle when the amount of hydraulic fluid is low and unsafe.

Still further, it is an object to provide a device so constructed that when connected to the master cylinder of a vehicular hydraulic brake system, the device will enable the system to "breathe" and will prevent the entrance of foreign materials, such as dirt, into the system.

These and other objects will be apparent in view of the following detailed description of the invention, together with the attached drawing.

In the drawings:

Fig. 1 is a view in elevation showing the device and a master cylinder;

Fig. 2 is a view, similar to Fig. 1, showing the device in the ignition open condition;

Fig. 3 is an enlarged transverse section of Fig. 2; and,

Fig. 4 is a view, similar to Fig. 3, of the device in the ignition closed condition.

Referring to the drawings, a preferred embodiment of the safety device for vehicular hydraulic brake systems is shown and indicated generally by the numeral 10. The body portion of the device 10 has, as one wall thereof, a distensible diaphragm providing a variable volume fluid chamber within the body. The device 10 also includes a connector providing communication between the chamber and a master brake cylinder, a pressure plate continually biased against the diaphragm, and a normally closed electrical means in the ignition circuit of a vehicle opened by a predetermined movement of the pressure plate relative to the body portion of the device.

In Fig. 1, the device 10 is shown connected to the top of a master cylinder indicated generally by the numeral 12. As is known to those skilled in the art, a master cylinder converts the mechanical force of a shaft or rod 13 actuated by a brake pedal linkage, into a hydraulic force which is transmitted to the several brake cylinders (not shown) by piping such as indicated at 14. In most present day automobiles, the cylinder 12 is mounted in the engine compartment, on the firewall separating the engine compartment from the automobile's interior.

The top of the cylinder 12 is formed by a plate 15 secured as by screws 16. In conventional cylinder construction, the plate 15 usually has a threaded plug (not shown) which is vented through a small orifice to the atmosphere, and which is removable to permit visual inspection of the amount of fluid in the cylinder (and thus, in the system), and refilling of the cylinder with fluid if required. In the present invention, the threaded plug is replaced by a fitting 18 secured to the top plate 15 and threaded into a connector or fitting 19, which is in turn threaded into the underside of the body portion or housing, indicated generally by the numeral 20, of the device 10. Thus, the interior of the cylinder 12 communicates with the interior of the housing 20.

The housing 20 has an annular sidewall 21 and an end plate 22. Atop the housing 20 and opposite of the fitting 19, a threaded plug 23 extends through the wall 21 and, when removed, provides an opening for filling the housing 20, the master cylinder 12, and the hydraulic system, with fluid.

As best shown in Figs. 3 and 4, a diaphrgam 25 is located transversely of the sidewall 21 to define a variable volume chamber 26 filled with hydraulic fluid. The diaphragm 25, which is distensible, resilient, impermeable and resistant to the fluid being used, may be of neoprene or other suitable material. The diaphragm is tightly secured against the sidewall 21 by a fastening ring 28 and screws 29.

The amount of fluid in the variable volume chamber 26, and thus the amount of fluid in the master cylinder 12 and the other elements of the braking system, is indicated by the extent to which the diaphragm 25 can be distended inwardly toward the end wall 22 of the housing (Fig. 3). The diaphragm 25 is continually being urged inwardly by a pressure means, indicated generally by the numeral 30.

The pressure means 30 includes a preferably disc-shaped pressure plate 32 in contact with the central portion of the diaphragm 25. The plate 32 has a hub 33 adapted for attachment to the inner end of a pressure arm 34. As best shown in Figs. 3 and 4, the pressure arm 34 extends substantially radially of the pressure plate and is then directed rearwardly and securely connected to a short shaft 35. The shaft 35, which provides the axis of rotation for the pressure plate inwardly or outwardly of the end wall 22, is rotatably mounted between parallel leg portions of a bracket 36, secured to the outer face of the diaphragm fastening ring 28 by screws 29. A coiled helical spring 37 is mounted around shaft 35 and has one end attached to the bracket 36 and the other end engaging the pressure arm 34, in such a manner as to continually urge the pressure plate 32 inwardly toward the end plate 22.

Attached to the pressure plate 32 and extending outwardly past the hub 33 is a preferably slightly curved rod 39. The rod 39 moves with the pressure plate and normally maintains closed the electrical means, indicated generally by the numeral 40, in the ignition circuit of the vehicle.

The electrical means 40, which is responsive to a predetermined movement of the rod 39, preferably includes a glass capsule 42 having a base 43 into which are led terminal wires 44 and 45 of the vehicle engine's ignition circuit. Within the capsule, a pool of mercury 46, or other similar displaceable conductor, normally completes the circuit between wires 44 and 45 closing the vehicle's ignition circuit (Fig. 1).

The capsule 42 is held within a spring clip 47 attached to a bracket 48 mounted transversely of the housing 20 on a pivot post or pin 49 extending outwardly from the fastening ring 28. A coiled helical spring 50, similar to spring 37 of the pressure means, is mounted around pin 49. One end of the spring 50 is attached to the fastening ring 28 and the other end to the bracket 48, in such a manner as to continually urge the bracket to rotate around pin 49 substantially 180° in a clockwise direction as viewed in Fig. 1. However, the rod 39 on the pressure plate normally interrupts such rotation when the chamber 26 is substantially filled with fluid.

The device 10 functions as follows:

As shown in Figs. 1 and 4, the variable volume chamber 26 within housing 20 is substantially filled with fluid; thus, also, are the master cylinder 12 and the other elements of the braking system. In this condition, the pressure plate 32, even though urged to do so by spring 37, cannot displace the diaphragm 25 inwardly toward the end wall 22. If the pressure plate is not displaced inwardly, the pin 39 will continue to interrupt rotation of the bracket 48 and the capsule 42 will remain upright and the ignition circuit closed.

In the event that the amount of fluid in the braking system and the master cylinder 12, and thus in the chamber 26, is less than that amount required for safe operation of the vehicle, the pressure plate will be forced inwardly toward the end wall 22 as shown in Figs. 2 and 3, a distance sufficient to release pin 39 from engagement with bracket 48, allowing rotation of the bracket to invert the capsule 42 and displace the mercury pool 46, opening the ignition circuit.

It is apparent that Figs. 1 and 4 represent the condition of the system when filled with fluid, and Figs. 2 and 3 the other extreme. In the event that the amount of fluid in the chamber 26 is below the normal amount, but is not unsafe, the position of the pin 39 with respect to the bracket 48 will indicate to the operator of the vehicle that fluid should be added to the braking system. As described above, additional fluid is added to the device 10 by merely removing the plug 23 and manually resetting arm 34. When the chamber 26 is filled, the plug 23 is reinserted and the braking system will be sealed against the entry of foreign matter, the chamber 26 serving to permit the system to "breathe."

In the drawings and specification one preferred form of the invention has been shown and described. It will be understood however, that modifications and changes may be made within the scope of the invention without departing from the spirit thereof, the invention being measured by the appended claims and not by details of the specification.

What is claimed is:

1. A device for monitoring the amount of fluid in a sealed hydraulic system comprising, a housing adapted for connection into said system, said housing having an annular sidewall, a rigid end plate and a distensible diaphragm forming a variable volume fluid chamber within the housing, a pressure plate adapted for contacting said diaphragm, spring means affixed to said housing for urging said pressure plate against said diaphragm toward said end plate, and, normally closed electrical means opened by a predetermined movement of said pressure plate relative to said end plate.

2. A device for monitoring the amount of fluid in a sealed hydraulic system comprising, a housing adapted for connection into said system, said housing having an annular sidewall, a rigid end plate and a distensible diaphragm forming a variable volume fluid chamber within the housing, an arm extending radially of said diaphragm and movably attached to said housing, a pressure plate attached to said arm and adapted for contacting said diaphragm, spring means mounted exteriorly of said fluid chamber for urging said arm and pressure plate toward said end plate, and, normally closed electrical means opened by a predetermined movement of said pressure plate relative to said end plate.

3. A device for monitoring the amount of fluid in a sealed hydraulic system comprising, a housing adapted for connection into said system, said housing having sidewalls, a rigid end plate and a distensible resilient diaphragm forming a variable volume fluid chamber within the housing, an arm extending radially of said diaphragm and movably attached at its outer end to said housing, a pressure plate attached to the inner end of said arm and adapted for contacting said diaphragm, said plate having a rod extending therefrom away from said diaphragm, pressure means mounted exteriorly of said fluid chamber for urging said arm toward said end plate and, normally closed electrical means, at least a portion of which are mounted on said housing, opened when said rod has moved a substantial distance toward said end plate.

4. A device for monitoring a vehicular hydraulic brake system and for opening the ignition circuit of the vehicle when the amount of fluid in the system is low and unsafe, comprising, a housing adapted for connection into said system, said housing having a distensible wall portion forming a variable volume fluid chamber within the housing, a pressure means biased exteriorly of said fluid chamber against said distensible wall, movement of said means inwardly of said housing being opposed by fluid in said chamber, and, electrical means responsive to a predetermined movement of said pressure means relative to said housing, said electrical means being adapted to control the ignition circuit of said vehicle.

5. A device for monitoring a vehicular hydraulic brake system and for opening the ignition circuit of the vehicle when the amount of fluid in the system is low and unsafe, comprising, a housing adapted for connection into said system, said housing having a distensible wall portion forming a variable volume fluid chamber within the housing, a pressure means biased exteriorly of said fluid chamber against said distensible wall, movement of said means inwardly of said housing being opposed by fluid in said chamber, and, electrical means responsive to a predetermined movement of said pressure means relative to said housing, said electrical means including terminal wires in the ignition circuit of the vehicle and a displaceable conductor capable of completing said circuit between said terminal wires.

6. A device for monitoring a vehicular hydraulic brake system and for opening the ignition circuit of the vehicle when the amount of fluid in the system is low and unsafe, comprising, a housing adapted for connection into said system, said housing having sidewalls, a rigid end plate and a distensible resilient diaphragm forming a variable volume fluid chamber within the housing, a pressure plate adapted for contacting said diaphragm, said pressure plate having a rod extending therefrom away from said diaphragm, spring means affixed to said housing for urging said pressure plate against said diaphragm toward said end plate, a post extending from said housing away from said pressure plate, a mercury switch rotatably mounted on said post, said switch including terminal wires in the ignition circuit of said vehicle, and, spring means affixed between said housing and said switch urging said switch to rotate, said rotation being interrupted by said rod extending from said pressure plate when said chamber is substantially filled with fluid.

References Cited in the file of this patent

UNITED STATES PATENTS

| 1,144,101 | Bradbury | June 22, 1915 |
| 2,459,938 | Higgins | Jan. 25, 1949 |
| 2,465,516 | Colyer | Mar. 29, 1949 |
| 2,652,125 | Dewhirst | Sept. 15, 1953 |
| 2,700,153 | Huckabee | Jan. 18, 1955 |
| 2,724,101 | Hallman | Nov. 15, 1955 |
| 2,752,447 | Shaffer | June 26, 1956 |